June 13, 1950    E. L. ARNESON    2,511,317
HANDLE FOR BOTTLE CARRYING CONTAINERS
Filed July 7, 1948    2 Sheets-Sheet 1
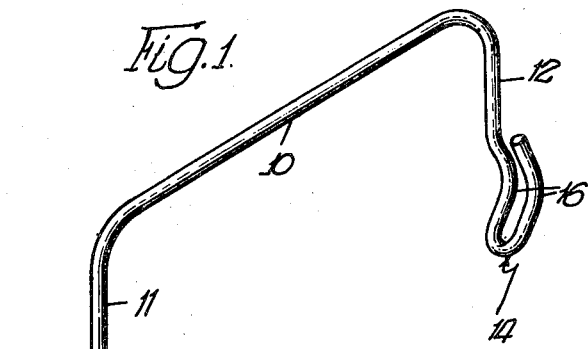
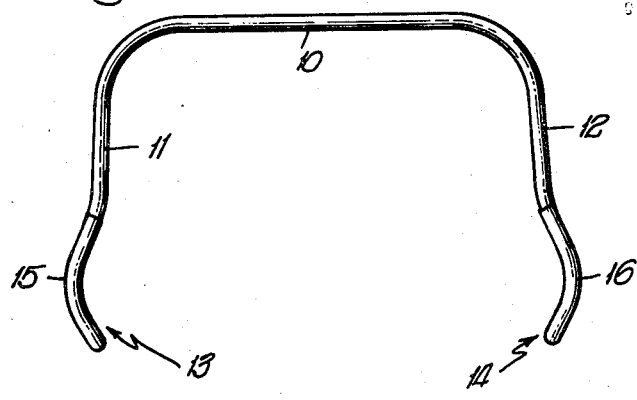
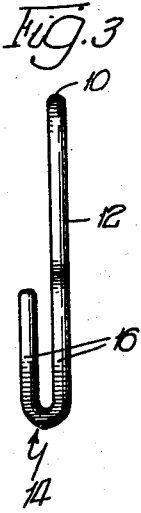
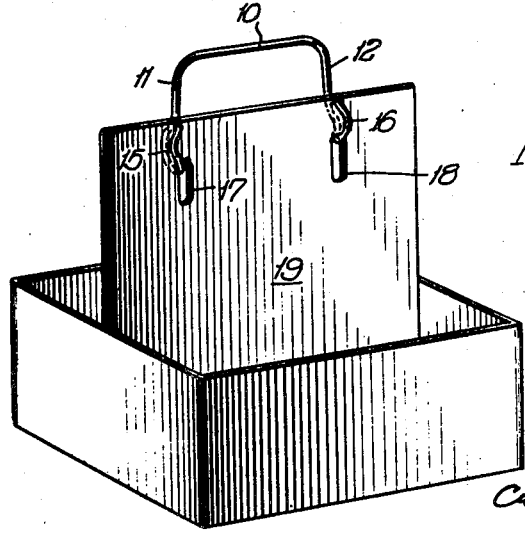
INVENTOR.
Edwin L. Arneson,
BY
Cromwell, Greist & Warden
Attys.

June 13, 1950  E. L. ARNESON  2,511,317
HANDLE FOR BOTTLE CARRYING CONTAINERS
Filed July 7, 1948  2 Sheets-Sheet 2
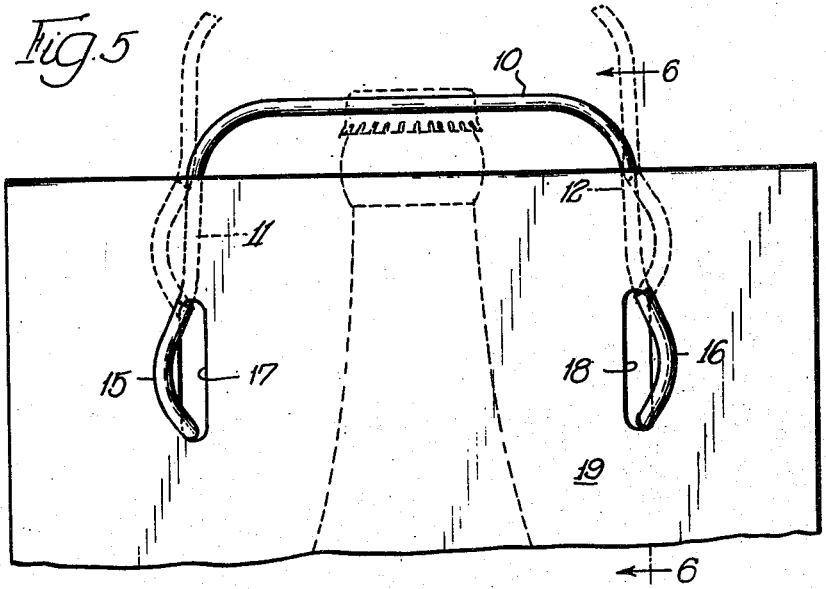
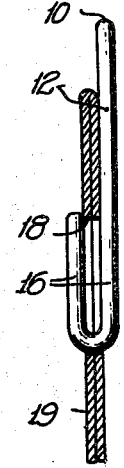
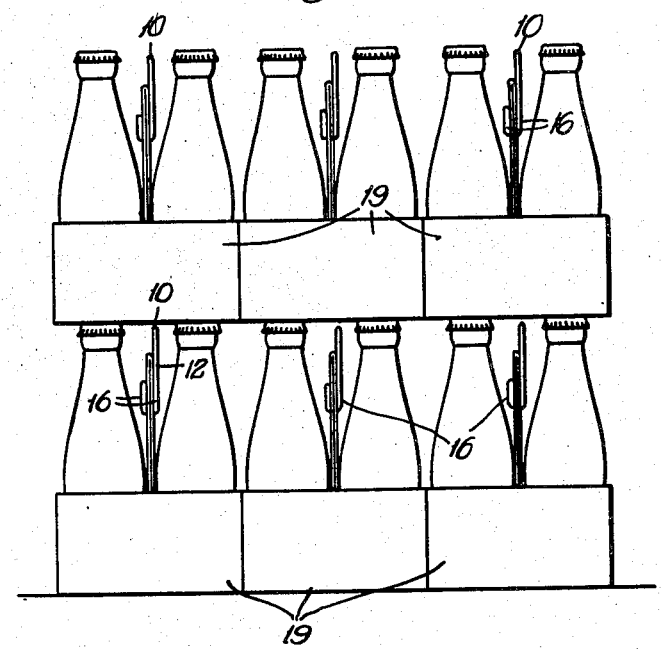
INVENTOR.
Edwin L. Arneson,
BY
Cromwell, Greist & Warden
ATTYS.

Patented June 13, 1950

2,511,317

UNITED STATES PATENT OFFICE 2,511,317

HANDLE FOR BOTTLE CARRYING CONTAINERS

Edwin L. Arneson, Morris, Ill., assignor to Morris Paper Mills, Chicago, Ill., a corporation of Illinois Application July 7, 1948, Serial No. 37,482

1 Claim. (Cl. 229—52)

This invention has to do with an improved type of carrying handle for a container. More particularly, it relates to a carrying handle which initially is inserted within openings in the central panel or partition of a container such as, for example, that type of container which is used for carrying bottled beverages, the handle being in the form of a bail having end hooks of a novel configuration, whereby the handle can be raised above the bottle tops for carrying purposes and lowered or retracted below the bottle tops so that such containers can be filled with bottles and stacked without the hooks becoming disengaged from the panel and interfering with the filling and stacking operation, and the provision of such a carrying handle and container is a principal object of the invention.

More specifically, it is an object of the invention to provide a container carrying handle, and a container adapted therefor, having a handle gripping portion with legs projecting therefrom, the legs terminating in hooks which are adapted to enter slotted openings provided therefor in a panel or partition of the container and to grip opposite sides thereof above the openings when the container is carried, the hooks having bent, bowed or curved portions providing wings whereby to engage opposite sides of the partition or panel adjacent the openings when the handle is lowered or retracted in order to maintain the handle in place in its vertical position with respect to the partition and to prevent the hooks or the handle from becoming disengaged from the openings in the panel or partition and falling or leaning toward the bottom of the container.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claim.

For a fuller understanding of the nature and objects of the invention reference should be had to the following detailed description taken in connection with the accompanying drawings, in which:

Fig. 1 is a perspective view of the handle carrying member embodying a preferred form of the invention;

Fig. 2 is a side elevational view thereof;

Fig. 3 is an end elevational view thereof;

Fig. 4 is a perspective view illustrating a preferred form of handle, such as that depicted in Figs. 1 through 3, inserted within openings in a panel or longitudinal partition of a diagrammatically illustrated carton or container, the handle appearing in upraised carrying position with the hooks engaging opposite sides of the partition or panel;

Fig. 5 is an actual scale size view of the upper portion of the longitudinal partition or panel of a container or carton showing the handle in raised dotted line position, as in Fig. 4, and in retracted or lowered solid line position wherein the novel hooking members engage opposite sides of the panel adjacent the opening to maintain the handle in upright position;

Fig. 6 is a transverse sectional view taken along the lines 6—6 of Fig. 5; and

Fig. 7 is a view illustrating the manner in which containers can be stacked in vertical alignment without interference from the carrying handle made in accordance with the principles of the present invention.

Referring more particularly to the drawings, there is shown a handle carrying member which, preferably, is made from a single piece of flexible wire of suitable thickness. The handle comprises an intermediate handle gripping portion 10 and extensions or legs 11 and 12 projecting therefrom. The legs terminate in hooks indicated generally at 13 and 14.

The most important feature of the invention resides in the novel configuration of the hooks 13 and 14. It will be observed that each hook is bent, curved or bowed to provide wings 15 and 16 respectively, the exact function of which will more fully appear hereinafter.

It should be noted that while the carrying handle is preferably made of a suitable wire or metallic rod stock it will be appreciated that the same can be made from plastic, semi-plastic or other suitable materials.

The carrying handle has utility for any carton or container having openings or slots at 17 and 18 for example, in one of its panels 19 suitable for permitting the hooks 13 and 14 to be inserted so that the panel can be gripped on opposite sides as more fully shown in Fig. 4, and in dotted line position in Fig. 5, in which the handle appears in raised position for carton carrying purposes. Each hook is sufficiently spaced apart so that it will frictionally engage opposite sides of the longitudinal partition so as to maintain it in raised position above the openings 17 and 18 in the panel 19. The carton or container is carried with the carrying handle in this position.

In applying the handle to the carrier, the legs 11, 12 are flexed sufficiently toward one another to enable insertion of the hooks or bights 13, 14 in the respective panel openings 17, 18, and, so inserted, are released to allow the wings to spread outwardly into engagement with opposite side margins of the openings or slots. To remove the handle, the opposite procedure is followed. The bowed formations 15, 16 overlie said side margins to maintain a gripping action on opposite surfaces of the panel, regardless of the vertical position of the handle relative to the panel.

The chief significance of the wings 15 and 16, however, is that the handle can be retracted or lowered to a position such as that illustrated in Figs. 5 and 6 and maintained in such vertical panel gripping position without danger of the handle or hooks becoming disengaged from the panel or partition member 19 and tilting sideways or laying over and away from the panel 19 and sliding through the openings 17 and 18. This is important for several reasons. If the handle leans away from the partition 19 it interferes with the operation of filling the cartons on standard bottle filling machines in which a plurality of bottles are placed simultaneously into the carton automatically. Such interference would cause jamming of the machine and breaking of bottles. After the cartons have been filled the handles will remain disposed in their vertical positions below the tops of the bottles. The filled cartons can then be stacked, one on top of the other in vertical alignment, the bottoms of the stacked cartons resting on the tops of the bottles immediately beneath as shown in Fig. 7. This eliminates pyramiding of cartons which heretofore was always necessary when handles projected above the bottle tops. In removing the cartons the vertically positioned handles can easily be grasped and drawn to upraised carton carrying position as shown in Fig. 4.

The manner in which the bent or curved wing portions 15 and 16 of the hooks 13 and 14 function is clearly illustrated in Fig. 5. There it will be seen that the wing portions engage opposite sides of the partition adjacent the openings 17 and 18 when the handle is in retracted or lowered position in order to maintain the handle in place in vertical position with respect to the partition. In other words, the wing members form tracks or channels actually having two dimensions. That is to say, there is a channel whereby there is a vertical gripping of the opposite sides of the panel 19 adjacent the openings 17 and 18 which is equal to the thickness of the wire or rod material used in providing the handle. There is also a transverse or horizontal gripping action brought about because of the bent portion in each hook forming the wings.

It will thus be seen that the objects hereinbefore set forth many readily and efficiently be attained and since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claim is intended to cover all of the generic and specific features of the invention herein described, and all statements of the scope of the invention which, as a matter of language might be said to fall therebetween.

Having described my invention what I claim as new and desire to secure by Letters Patent is:

A handle for a bottle carrier or like container comprising a length of flexible stock shaped to provide a longitudinally extending gripping portion and a pair of generally coplanar legs offset downwardly from said gripping portion, each of said legs terminating in a U-shaped upwardly opening bight which is engageable with said carrier, said bights including portions spaced laterally from said respective legs and each disposed in a plane which generally parallels the plane of said gripping portion and legs, the lateral spacing of said bight portions from said legs at the open throat of the bight corresponding approximately to the lateral spacing of the remainder of the bight portions from said legs, said respective bights being bowed in opposite directions generally paralleling the plane of said gripping portion and legs, so as to enable frictional gripping of said carrier between and substantially throughout the entirety of each of said bights and the laterally adjacent portion of the associated leg.

EDWIN L. ARNESON.

REFERENCES CITED

The following references are of record in the file of this patent:

UNITED STATES PATENTS

| Number | Name | Date |
|---|---|---|
| 703,050 | Duthie | June 24, 1902 |
| 1,241,542 | Miller | Oct. 2, 1917 |
| 2,195,070 | Backert | Mar. 26, 1940 |
| 2,285,399 | Arneson | June 9, 1942 |
| 2,316,186 | Powell | Apr. 13, 1943 |